Oct. 9, 1973  J. O. JOHNSON, JR  3,764,508
ELECTROCHEMICAL OXYGEN DEMAND MEASURING SYSTEM
Filed Feb. 23, 1972
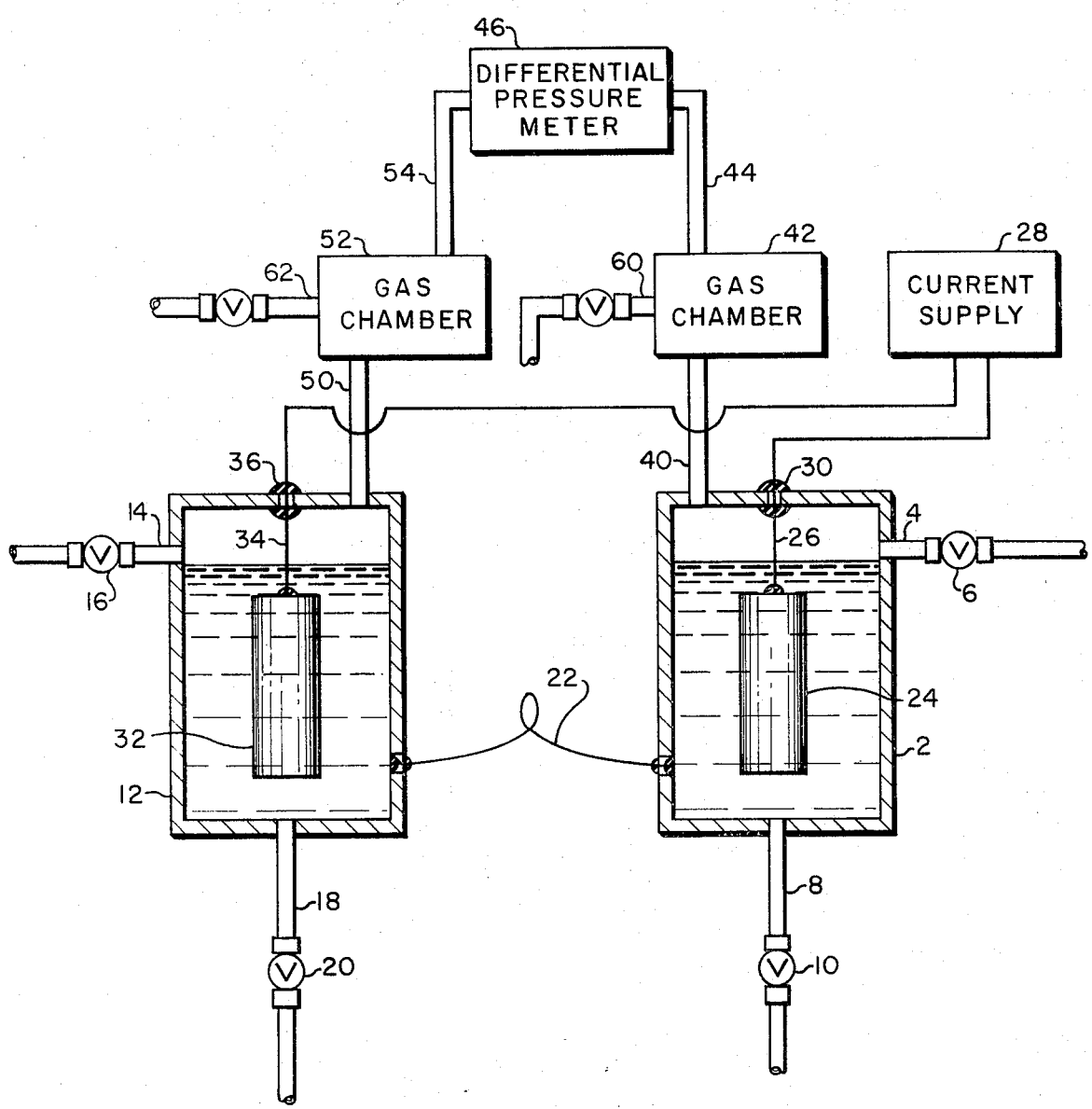

3,764,508
ELECTROCHEMICAL OXYGEN DEMAND
MEASURING SYSTEM
Justin O. Johnson, Jr., Levittown, Pa., assignor to
Honeywell Inc., Minneapolis, Minn.
Filed Feb. 23, 1972, Ser. No. 228,582
Int. Cl. G01n 27/26
U.S. Cl. 204—195 B      4 Claims

ABSTRACT OF THE DISCLOSURE

An electrochemical oxygen demand measuring system having a pair of test cells containing an aqueous test sample and an aqueous reference sample, respectively. Each test cell has a pair of electrodes immersed in the fluid in the respective cell and connected in a series path between output terminals of a predetermined current source. Electrolysis of the respective fluids produces gaseous products from each cell with the net amount of test sample cell electrolysis products being affected by the oxygen demand of the test sample. The gaseous products from each cell are collected and applied to respective sides of a differential pressure measuring apparatus to produce an indication of the oxyyen demand of the test sample.

BACKGROUND OF THE INVENTION

Other electrochemical oxygen demand measuring systems are disclosed in the copending applications of Justin O. Johnson, Ser. No. 75,438, filed Sept. 24, 1970, now U.S. Pat. No. 3,725,236; John P. Cummings, Ser. No. 58,448, filed July 27, 1970 now abandoned and John P. Cummings et al., Ser. No. 58,254, filed July 27, 1970, now U.S. Pat. 3,676,321, which applications are assigned to the same assignee as the present invention.

An object of the present invention is to provide an improved electrochemical oxygen demand measuring system.

Another object of the present invention is to provide an improved electrochemical oxygen demand measuring system for concurrently electrolyzing a test fluid and a reference fluid in physically separate test cells to provide an indication of the oxygen demand of the test fluid.

SUMMARY OF THE INVENTION

In accomplishing these and other objects, there has been provided, in accordance with the present invention, an electrochemical system for electrolyzing a first fluid sample and comparing the pressure of all of the gaseous products produced thereby with the pressure of all of the gaseous products produced by a similar electrolysis of a reference fluid.

BRIEF DESCRIPTION OF THE DRAWINGS

A better understanding of the present invention may be had when the following detailed description is read in connection with the accompanying single figure drawing which is a pictorial illustration of an electrochemical oxygen demand system embodying the present invention.

DETAILED DESCRIPTION

Referring to the single figure drawing in more detail, there is shown an electrochemical oxygen demand system having a first test cell 2. An inlet line 4 is connected to the test cell 2 and is controlled by a selectively operable valve 6. The inlet line 4 is arranged to be connected to a source of an aqueous sample for filling the test cell 2. An outlet line 8 is connected to the test cell 2 and is controlled by a second valve means 10. The outlet line 8 is arranged to be connected to an aqueous sample disposal means for receiving the contents of the test cell 2 after an electrochemical oxygen demand test is completed thereon.

A second test cell 12, similar to the first test cell 2, is connected by a supply line 14 through a valve 16 to a source of an aqueous reference fluid. An outlet line 18 is connected through a valve 20 to means for receiving the aqueous reference fluid from the second test cell 12 after completion of the electrochemical oxygen demand test thereon. The walls of the closed test cells 2 and 12 may be made of an electrically conducting material or, alternatively, the inside surface of the test cells 2 and 12 may be covered with an electrically conductive material. In either case, the electrically conductive walls or electrically conductive wall covering of the test cells 2 and 12 are used as electrodes and are interconnected by an electrically conductive wire 22. A second electrode 24 is centrally suspended in the first test cell 2 by an electrically conductive wire 26, which wire is connected through the wall of the test cell 2 to a current supply 28 and is insulated from the wall of the test cell 2 by an electrically insulating bushing 30. A similar second electrode 32 is centrally suspended within the second test cell 12 by an electrically conductive wire 34 which passes through an electrically insulating bushing 36 in the wall of the second test cell 12 and is ultimately connected to the current supply 28. The suspended electrodes 24 and 32 are connected to opposite sides of the current supply 28 to form an electrical path in combination with the aqueous samples in the test cells 2 and 12, the aforesaid wall electrodes, and the common interconnecting wire 22.

The first test cell 2 is connected by an outlet pipe 40 to a first gaseous product storage chamber 42. The first storage chamber 42 is, in turn, connected by an outlet pipe 44 to a differential pressure meter 46 may be any suitable device capable of sensing differential pressure between two input pressures and providing an indication of the difference therebetween, such devices being well known in the art.

The second test cell 12 is similarly connected by an outlet pipe 50 to a second gaseous product storage chamber 52, which, in turn, is connected by an outlet pipe 54 to the other side of the differential pressure meter 46. The storage chambers 42 and 52 may each be provided with selectively operable vent means, e.g., vent pipes 60 and 62, respectively, for venting the gases stored therein after completion of the electrochemical oxygen demand test on the aqueous samples in the test celles 2 and 12.

The operation of the present invention, utilizing an exhaustive electrolysis technique, consists essentially of electrolyzing the aqueous test sample in the test call 2 and the aqueous reference sample in the test cell 12 until electrochemically active material contained in the test sample is either quantitatively removed from the test sample solution or is changed to an inactive form. In other words, during the exhaustive electrolysis, the electrical current from the current source 28 is passed in a predetermined direction between the electrode 24 and an electrode provided in or on the wall of the test cell 2 whereby oxygen is produced at the anode electrode 24 with hydrogen being evolved at the cathode electrode in the wall of the storage chamber 2. When organic materials are present in the test fluid sample, they react with the oxygen produced at the anode and little gaseous oxygen is left to contribute to the gaseous products partial pressure to be measured by the differential pressure meter 46. On the other hand, with no organic material in the test solution as in the case of reference sample, a quantitative, i.e. predictable, amount of gaseous oxygen is evolved to produce in combination with the evolved hydrogen a gaseous pressure for measurement by the measuring apparatus 46. The oxygen demand of a contaminated, i.e., containing organic matter, fluid sample is, therefore, related to the quantitative oxygen and hydrogen gaseous pressure observed after electrolysis of the test fluid sample.

In this operation, the technique of the present invention involves the passage of sufficient electrical current in the aforesaid predetermined direction to render the test solution in the test cell 2 substantially electro-inactive, or at least until a stable reaction rate is achieved. The test solution is deemed to be substantially electro-inactive when the current input to the cell delivers a theoretical quantity of evolved gaseous oxygen, according to Faraday's law. This law, simply stated, is that the amount of a product formed by electrolysis is directly proportional to the amount of electricity flowing. The proportionality, or Faraday, constant of 96,520 amp-seconds is the quantity of charge which will liberate one equivalent weight of material at an electrode solution interface.

The determinations are obtained by adjusting the anode potential to a value sufficient to produce gaseous products in the aqueous test sample. Under these conditions, the potential is sufficiently high to drive any possible organic electrode reactions to substantial completion. In practicing the operation of the present invention, the electrical power from the source 28 is coupled to the anode and cathode of the first test cell 2 to deliver a predetermined quantity of electrolyzing current in a predetermined direction between the electrodes at a suitable potential level. The current from the electrical power supply means 28, accordingly, contributes to four simultaneous reactions; the first being the generation of oxygen by electrolysis, a portion of which will combine directly with the organic products present in the test solution in the storage chamber 2; the second being the electro-oxidation of organic products by reactions occurring at the anode electrode 24; the third being the anode electrode surface performing an oxidizing function under the reaction conditions and the fourth, the generation of hydrogen by electrolysis. Concurrently, the same current is passed through the second test cell 12 by means of the interconnecting wire 22 to release the aforesaid predictable amount of gaseous products from an uncontaminated aqueous sample. The gaseous products from the test cell 2 and 12 are stored in the storage chambers 42 and 52, respectively.

The differential pressure measuring apparatus 46 is provided in association with the first and second gaseous product storage chambers 42 and 52 for determining the difference between the gaseous pressures, or evolution rate, of the gaseous products, e.g., oxygen and hydrogen, upon delivery of the electrolyzing current to the test cells 2 and 12. This differential pressure, which in the exemplary apparatus is dependent upon the oxygen and hydrogen gaseous pressures produced in the respective storage chambers 42 and 52, therefore, provides an indication of that portion of total power input which has contributed to the oxidation of organic waste products present in the test fluid sample in the test cell 2. The fundamental principles underlying the operation of the present invention can be explained on the basis of the competing reactions in the aqueous test sample. If an electrical current is passed through a simple electrolytic solution in the absence of electro-active material, such as the reference fluid found in the second test cell 12, gaseous oxygen and hydrogen would be produced at the electrode reactions. For every four electrons passed through the cell, one molecule of gaseous oxygen is produced and two molecules of gaseous hydrogen are produced. Therefore, a relationship exists between the number of electrons passed and the amount of gaseous products produced according to Faraday's law, as previously discussed. In the event that an electro-active organic material is present, electrons can also be transferred from the material to the anode 24. Inasmuch as the same number of electrons are transferred as before, a smaller amount of gaseous oxygen will be evolved since the electrons are furnished to the anode 24 by the two concurrent reactions. Further, a portion of the evolved gaseous oxygen will be consumed in oxidizing the organic material in a contaminated test sample. Thus, the amount of gaseous oxygen available to contribute its partial pressure to the total gaseous pressure in the storage chamber 42 will be correspondingly reduced.

In the present technique, therefore, the fixed number of electrons (a known coulombic input) are passed between the electrodes in the first test cell 2 and the second test cell 12 by means of the interconnecting common wire 22. The oxygen demand of the test sample in the first test cell 2 containing organic waste products is related to the difference in the pressures of the gaseous products as represented by the differential pressure measused by the differential pressure apparatus 46. The differential pressure apparatus 46 is used to monitor the differential pressure within the two storage chambers 42 and 52 until the reaction in the test cells 2 and 12 is completed. This can be accomplished by either electrolyzing for a period of time known to be in excess of the coulombic input necessary to complete the reaction with the electro-active material in the test cell 2 or passing the known current through the cell until the rate of gaseous product production is similar for the two test cells 2 and 12. The final measurement by the apparatus 46 is based on the relationship that as the oxygen demand of a sample in the test cell 2 increases, the difference between the observed partial pressures also increases.

For purposes of uniformity, the test fluid sample is preferably in a solution of 1 N KOH, this solution providing a pH in excess of 10, i.e., moderately alkaline. The KOH acts as a means of combining with the gaseous $CO_2$ generated in the oxidizing reactions of the organic material present in the aqueous test sample; and, hence, the partial pressure of $CO_2$ is not involved in the determination of the differential pressures by the differential pressure measuring apparatus 46. The reference sample in the second test cell 12 can be similarly alkalinized to increase its electrical conductivity for the electrolyzing current. In summary, in the absence of organic waste material, the cell output of gaseous products and particularly gaseous oxygen is at a maximum in both test cells 2 and 12 since all electrical current passing through the test cells 2 and 12 is utilized to generate gaseous products and the evolved oxygen contributes an undiminished partial pressure. Conversely, the presence of oxidizable contaminants in the sample in the first test cell 2 will decrease the net gaseous products produced by the first test cell for storage in the storage chamber 42 in proportion to the contaminant concentration, and the resulting differential pressure indicated by the measuring meter 46 will be an indication of the biological oxygen demand of the sample in the test cell 2.

In operation, the current supply 28 is arranged to supply a predetermined current through the previously discussed electrical path including the aqueous mediums in the test cells 2 and 12, the interconnecting wire 22 and the electrodes 24 and 32. This current is effective to produce a concurrent electrolysis of the electrolyte in the test cells 2 and 12 with a consequent evolution of hydrogen and oxygen at the respective electrodes within the test cell. It is to be noted in this respect that, using the structure of illustrated embodiment, the wall of the test cells 2 and 12 can form one electrode of the electrolysis system. The evolved gases are collected above the aqueous samples in the test cells 2 and 12 and are fed by the outlet pipes 40 and 50, respectively, to the respective ones of the gas storage chambers 42 and 52. Subsequently, the accumulated gaseous pressures in the gas storage chambers 42 and 52 are effective to produce an indication of differential pressure by the differential pressure meter 46.

Inasmuch as the first test cell 12 is arranged to be filled with an aqueous sample for determining its biological oxygen demand with respect to contaminating materials contained therein, the second test cell 12 is arranged to be filled with a reference fluid, e.g. uncontaminated water, which is electrolized to produce a standard amount of evolved gases dependent on the amplitude of the current from the current supply 28. Accordingly, a comparison of the pressure of the evolved gases from the test cells 2 and 12 is effective to produce an indication of the amount of contamination of the aqueous sample in the first test cell 2 inasmuch as the amount of oxygen evolved as a gas for storage in the gas chamber 42 will be dependent on the consumption of oxygen within the aqueous sample within the first test cell 2. In other words, if the sample in the first test cell 2 is uncontaminated water, the amount of evolved gases will be the same as the gases evolved from the second test cell 12 and this fact will be evidenced by a zero differential pressure indicated on the differential pressure meter 46. Any deviation from an uncontaminated water sample in the first test cell 2 will produce a decrease in the evolved gases as indicated by the differential pressure meter 46 in comparison with the gases evolved from the second test cell 12.

Accordingly, it may be seen that there has been provided, in accordance with the present invention, an improved electrochemical system for determining an oxygen demand of an aqueous test sample by an electrolysis of the test sample and a comparison of the pressure of all of the produced gaseous products with respect to the pressure of all of the gaseous products produced by a similar electrolysis of a reference aqueous sample.

The embodiments of the invention in which an exclusive property or privilege is claimed are defined as follows:

1. An electrochemical system comprising first means for electrolyzing a first aqueous sample to produce gaseous products, second means for electrolyzing a second aqueous sample to produce gaseous products, current supply means connected to said first and second means to supply an electrolyzing current serially therethrough, and differential pressure measuring means connected to said first and second means to measure the difference in pressure of all of said gaseous products from said first means with respect to all of said gaseous products from said second means wherein said first means includes a first test cell and a pair of first electrodes in said test cell, and said second means includes a second test cell and a pair of second electrodes in said second test cell, and said current supply means includes a source of electrical current having a pair of output terminals, means connecting one of said first electrodes to one of said output terminals and one of said second electrodes to another one of said output terminals, and electrically conductive means connecting the remaining one of said first electrodes to the remaining one of said second electrodes.

2. An electrochemical system as set forth in claim 1 wherein said first test cell includes means to fill said first cell with an aqueous sample and means to drain said aqueous sample from said first cell and said second cell includes means to fill said second cell with an aqueous sample and means to drain said aqueous sample from said second cell.

3. An electrochemical system as set forth in claim 1 wherein said first and second test cells having similar internal volumes.

4. An electrochemical system as set forth in claim 1 wherein one of said pair of electrodes in said first and second test cells is substantially centrally disposed therein and the other one of said pair of electrodes in said first and second test cells is arranged to surround said centrally disposed electrodes while being spaced therefrom and electrically insulated with respect thereto.

References Cited
UNITED STATES PATENTS

| | | | |
|---|---|---|---|
| 3,330,755 | 7/1967 | Mahany | 204—230 |
| 3,045,665 | 7/1962 | Moyat | 204—129 |
| 2,773,497 | 12/1956 | Anzi et al. | 204—195 R |
| 3,336,215 | 8/1967 | Hagen | 204—230 |

TA-HSUNG TUNG, Primary Examiner

U.S. Cl. X.R.

204—1 T, 269, 270, 272, 278